United States Patent [19]

Decker

[11] 4,373,389
[45] Feb. 15, 1983

[54] DEVICE FOR CAPACITIVE LEVEL MEASUREMENT

[75] Inventor: Rainer Decker, Hamburg, Fed. Rep. of Germany

[73] Assignee: Precitronic Gesellschaft fur Feinmechanik und Electronic m.b.H., Hamburg, Fed. Rep. of Germany

[21] Appl. No.: 193,930

[22] Filed: Oct. 6, 1980

[30] Foreign Application Priority Data

Oct. 15, 1979 [DE] Fed. Rep. of Germany ....... 2941652

[51] Int. Cl.³ .......................................... G01F 23/26
[52] U.S. Cl. .................................. 73/304 C; 141/83; 141/198; 361/284
[58] Field of Search .................. 73/304 C; 361/284; 141/83, 198

[56] References Cited

U.S. PATENT DOCUMENTS

| | | | |
|---|---|---|---|
| 2,824,449 | 2/1958 | Childs | 73/304 C |
| 2,841,161 | 7/1958 | Williamson | 73/304 C |
| 2,849,882 | 9/1958 | Lee | 73/304 C |
| 2,936,411 | 5/1960 | Doty | 361/284 |
| 3,050,999 | 8/1962 | Edwards | 73/304 C |
| 3,321,971 | 5/1967 | Llewellyn et al. | 73/304 C |
| 3,391,547 | 7/1968 | Kingston | 141/198 X |
| 3,827,300 | 8/1974 | Thaler | 73/304 C |
| 3,991,614 | 11/1976 | Ditzler | 73/304 C |
| 4,133,454 | 1/1979 | Arthur et al. | 73/304 C |
| 4,176,553 | 12/1979 | Wood | 361/284 X |
| 4,212,202 | 7/1980 | Schmidt | 73/304 C |

*Primary Examiner*—Daniel M. Yasich
*Attorney, Agent, or Firm*—Arnold, White & Durkee

[57] ABSTRACT

A device for measuring the fill level of a liquid medium in a container by measuring the capacitance between electrodes contained in the medium is disclosed. A pair of electrodes in which one of the electrode is divided over its height into two partial surfaces (F1, F2) which are insulated from one another. Each surface forms a partial capacitor (C1, C2) with the other electrode. The divided electrode is characterized in that at least one of the surfaces (F1) or (F2) has a width which increases or decreases over the height of the electrode. By the appropriate combination of the partial capacitances, the level of the medium can be determined as well as a separate determination of the fluid's susceptibility (K).

7 Claims, 3 Drawing Figures

DEVICE FOR CAPACITIVE LEVEL MEASUREMENT

BACKGROUND OF THE INVENTION

The invention concerns a device for the capacitive level measuring of a liquid in a container in which two electrodes are positioned in the container and extend above the filled level area of the container. The two electrodes form a measuring condenser in which the capacitance varies according to the level (filled state) of the fluid. One of the electrodes is divided along its height into two partial surfaces which are insulated from one another to form two partial capacitors.

Usually, in the capacitance measurement of the level of a fluid, the dielectric susceptibility K of the filling medium is assumed to be constant. That is, it is assumed to be the average value over the work temperature range and the spectrum of the K values of all fill mediums to be processed. The indicator for measuring the capacitance is then set to this average value. Frequently however the susceptibility values of the fill mediums to be measured are so far apart that a measurement with the aid of the average value is no longer possible, or is imprecise. A reference condenser has been used in the past for measurements of mediums with rather large variations of the K values. This reference condenser is constantly in contact with the mediums and must be positioned, for example, at the lowest position of the container to be able to guarantee the reference measurement even at low levels of filling.

The disadvantage of this method is that the comparison condenser is subject to increased stress due to dirtying and corrosion which results in instances where unfavorable values for the conductibility and dielectric susceptibility are measured at the location of the reference condenser. These unfavorable readings may significantly deviate from the rest of the container contents.

Accordingly, it would be advantageous to provide a means for capacitively measuring the level of a fill medium in a container in which the variable dielectric susceptibility of the fill medium is considered, and where separate conclusions concerning the level and the susceptibility of the medium can be made.

SUMMARY OF THE INVENTION

In accordance with the invention, a device for the capacitive measurement of the level of a medium is disclosed. An electrode arrangement having first and a second electrodes is contained in and extends over the fill level range of the container so that the capacitance between the two electrodes varies as a function of the level of the medium. The first electrode is excited with an electrical signal suitable for measuring the capacitance between the two electrodes. The second electrode then outputs a signal proportional to the capacitance therebetween.

The second electrode is divided along its height into two partial surfaces thereby forming two partial capacitors with the first electrode. This arrangement of the partial surfaces has the result that in accordance with the invention the part of the one partial surface covered by the liquid does not increase linearly, but rather quadratically, for example, along with the rising level. The other partial surface is preferably dimensioned in such a manner that the sum of the two partial surfaces increases in a linear fashion as the level rises. both the magnitude of the susceptibility and the magnitude of the level of the medium to be measuredcan be separately determined by a computer link to microprocessor systems from the measured partial capacitances by forming sums and differences. The separation of the inner electrode into two equally large partial surfaces which are triangular in their development is particularly advantageous. The one partial surface points down with its tip and the tip of the other partial surface points up.

A means is provided by determining the fluid level of the medium as a function of the value of the partial capacitances. Included in this determining means is a summation means for generating a signal proportional to the sum of the partial capacitances, and a diferencing means for generating a signal proportional to the difference of the partial capacitances. These two functions could be performed either by analog circuits or by appropriate analog-to-digital conversion techniques including digital circuits. In one embodiment of the invention, a microprocessor means is provided for processing the partial capacitor signals to determine the level of the medium.

BRIEF DESCRIPTION OF THE DRAWINGS

Reference should be had to the following detailed description of the invention taken in conjunction with the accompanying drawings in which.

Similar reference numerals refer to similar parts throughout the several views of the drawings.

DETAILED DESCRIPTION OF THE PREFERRED EMBODIMENT OF THE INVENTION

Figure 1:
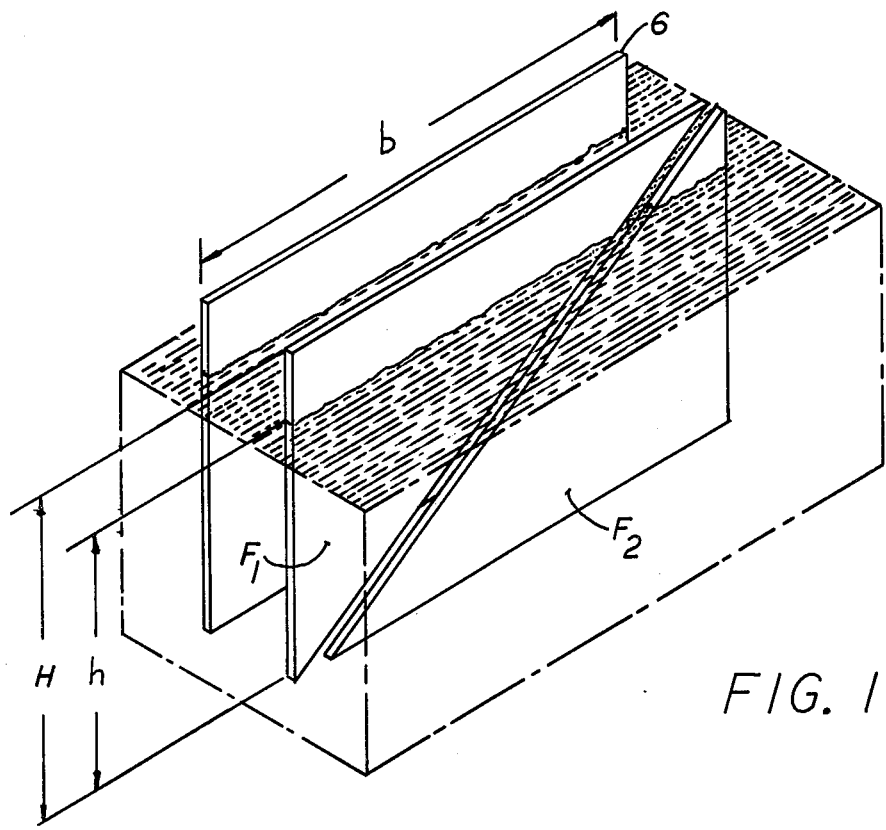
FIG. 1 shows the surfaces of the immersed measurement electrodes of the present invention in development, with the inner electrode means being indicated by two triangular sheets.

Referring to the figures and first to FIG. 1, the measuring condenser of the invention consists with advantage of two coaxial, cylindrical electrodes (6, $F_1$-$F_2$), the inner electrode of which is divided into two sheets ($F_1$, $F_2$) as is shown in FIG. 1. The partial surfaces $F_1$ and $F_2$ are congruent triangles which together form a right-angled development surface with height H and width b which corresponds to the circumference of the inner electrode.

Figure 2:
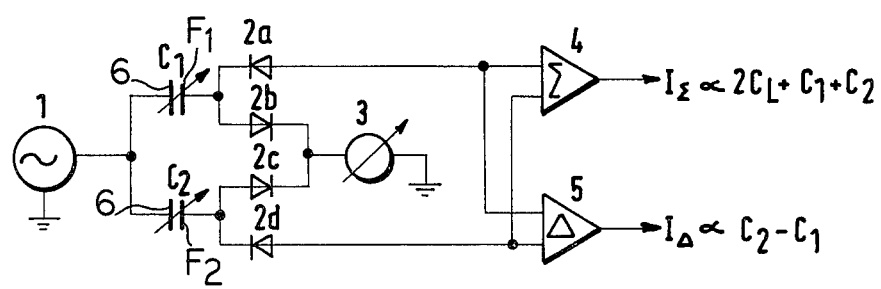
FIG. 2 shows a diagram of the circuit needed for the measuring.
Figure 3:
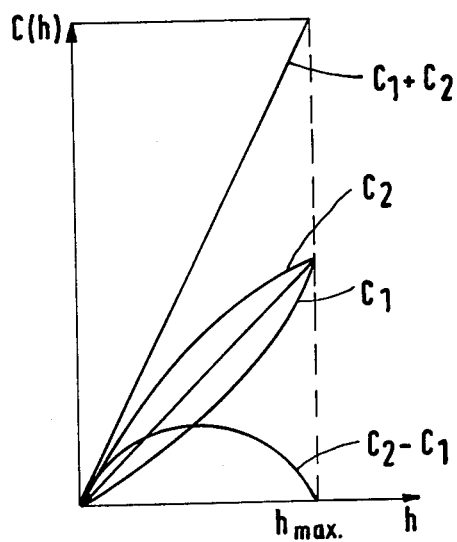
FIG. 3 shows the partial capacitances developed by the device of the invention in dependency on the level in a graphic representation.

If the outer electrode 6 is driven from generator 1 by an alternating current of a known voltage, waveform and frequency, then an equally large, pulsating direct current of the opposite polarity, which is proportional to the capacitance $C_1$ and $C_2$, flows to the electrode in the known circuit of FIG. 2 in each of the two partial branches with oppositely poled diodes 2a, 2b, 2c, 2d. Given by the geometry of the partial surface $F_1$ and $F_2$, these partial capacitances $C_1$ and $C_2$ depend in a calculatable manner on the fill level h and the dielectric susceptibility K of the fill medium to be measured.

It is assumed that the cylinder diameter is large in relation to the electrode interval, and there is a homogenous medium, then both partial capacitances $C_1$ and $C_2$ are characterized in an approximation valid for the level plate condenser:

$$C_1 = C_L + K \cdot F_1 \cdot c = C_L + K \cdot h^2 \cdot b \cdot c \qquad (1a)$$

$$C_2 = C_L + K \cdot F_2 \cdot c = C_L + K \cdot c \cdot (h \cdot b - h^2 \cdot b) \qquad (2b)$$

In these equations $C_L$ is the empty capacitance, which is approximately equally large for both branches and is composed of the capacitance of the electrodes with air as dielectric and the parasitic capacitances. K is the dielectric susceptibility of the medium, c is a geometry-dependent constant, b is the circumference of the inner electrode and h is the medium level to be determined.

The addition and subtraction of equations 1a and 1b yields the following new equations:

$$C_1 + C_2 = 2C_L + K \cdot h^2 \cdot b \cdot c + K \cdot c \cdot (h \cdot b - h^2 \cdot b) \qquad (2a)$$
$$= 2C_L + K \cdot c \cdot h \cdot b$$

$$C_2 - C_1 = K \cdot c (h \cdot b - h^2 \cdot b) - K \cdot h^2 \cdot b \cdot c \qquad (2b)$$
$$= -2K \cdot h^2 \cdot b \cdot c + K \cdot c \cdot h \cdot b$$

This addition can be performed electronically in a very simple manner by summation of the currents of each partial path 2b, 2c and indication via a current-measuring device 3. This device 3 can function simultaneously as an emergency indicator. The addition and subtraction can also be performed by analog or digital calculators 4 and 5.

If the values $C_L$, c and b are numerically known, the values K and h to be determined can be calculated easily from these two equations. This can be done, for example, with the aid of a microprocessor, which also makes it possible to consider the influence of a container with any shape, so that the volume of the medium can also be determined from fill level h.

It is furthermore possible, by taking as base a functional connection between the material magnitudes susceptibility K and specific density $\rho$, to calculate the mass of the fill medium without a separate measurement of density being necessary.

In describing the invention, reference has been made to a preferred embodiment. However, those skilled in the art and familiar with the disclosure of the invention may recognize additions, deletions, substitutions or other modifications which would fall within the purview of the invention as defined in the appended claims.

I claim:

1. A capacitance type measuring device for measuring the level of liquid in a container, comprising:
    (a) first, second and third electrodes arranged in said container to be in contact with said liquid, said electrodes being coextensive over a height (H) embracing at least the possible level variations of said liquid;
    (b) said second electrode ($F_1$) being opposed to part of said first electrode for forming therewith a first measuring condenser having said liquid as a dielectric and having its capacitance responsive to the level and dielectric constant of said liquid;
    (c) said third electrode ($F_2$) being opposed to another part of said first electrode and forming therewith a second measuring condenser having said liquid as a dielectric and having its capacitance responsive to the level and dielectric constant of said liquid;
    (d) at least one of said second and third electrodes having its width varying over its height, and the dependence of the width from the height being different in said second and third electrodes;
    (e) a means for applying electrical signals to said first and second measuring condensers and for obtaining therefrom first and second output signals responsive to the capacitances of said first and second condensers, respectively, which in turn are differently responsive to the level and dielectric constant of said liquid owing to said different dependence of width from height; and
    (f) means for processing said first and second output signals together so as to obtain at least one of a measuring signal responsive only to said liquid level irrespective of said dielectric constant and a measuring signal responsive only to said dielectric constant irrespective of said level.

2. The device according to claim 1 wherein said processing means includes:
    (a) summation means for producing a signal proportional to the sum of the capacitances of said first and second measuring condensers; and
    (b) differing means for producing a signal proportional to the difference of the capacitances of said first and second measuring condensers.

3. The device according to claim 1 wherein the width of said second electrode constantly increases over its height and the width of said third electrode constantly decreases over its height so that the sum of the widths of said second and third electrodes at any given height is constant.

4. The device according to claim 1 wherein said second and third electrodes are equally large surfaces, triangular in shape, one of which points downward with its tip and the other points upward with its tip.

5. The device according to claim 1 further including a microprocessor means responsive to the signals from said first and second measuring condensers, for determining the level height (h) and dielectric susceptibility (K) as a function of the surface nature of said second and third electrodes.

6. The device according to claim 5 wherein the signals from said first and second measuring condensers are combined in an analog manner by a circuit with linear and non-linear construction elements (4, 5).

7. The device according to claim 5 wherein the signals from said first and second measuring condensers are combined by means of respective analog-to-digital converters including digital summation circuit means for summing the digital conversion signals from each converter.

* * * * *

UNITED STATES PATENT AND TRADEMARK OFFICE
CERTIFICATE OF CORRECTION

PATENT NO. : 4,373,389
DATED : Feb. 15, 1983
INVENTOR(S) : Rainer Decker

It is certified that error appears in the above-identified patent and that said Letters Patent are hereby corrected as shown below:

Column 1, line 67, "both" should read --Both--.

Column 2, line 1, "measuredcan" should read --measured can--;

line 13, "diferencing" should read --differencing--.

Column 3, line 3, "(2b)" should read --(1b)--.

Column 4, line 20, before "means" insert --a--.

Signed and Sealed this

Seventh Day of June 1983

[SEAL]

Attest:

DONALD J. QUIGG

Attesting Officer     Acting Commissioner of Patents and Trademarks